(12) United States Patent
Kim et al.

(10) Patent No.: US 9,562,193 B2
(45) Date of Patent: Feb. 7, 2017

(54) LIQUID CRYSTAL DISPLAY

(71) Applicant: Samsung Display Co., Ltd., Yongin (KR)

(72) Inventors: Si Heun Kim, Asan-si (KR); Chang-Hun Lee, Hwaseong-si (KR); Daisuke Inoue, Cheonan-si (KR); Mi Suk Kim, Cheonan-si (KR); Tae Ho Kim, Asan-si (KR); So Youn Park, Hwaseong-si (KR); Keun Chan Oh, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 58 days.

(21) Appl. No.: 14/505,248

(22) Filed: Oct. 2, 2014

(65) Prior Publication Data
US 2015/0103300 A1    Apr. 16, 2015

(30) Foreign Application Priority Data

Oct. 11, 2013   (KR) .................... 10-2013-0121474

(51) Int. Cl.
| | |
|---|---|
| G02F 1/1343 | (2006.01) |
| C09K 19/58 | (2006.01) |
| G02F 1/1337 | (2006.01) |
| G02F 1/137 | (2006.01) |

(52) U.S. Cl.
CPC ......... C09K 19/586 (2013.01); G02F 1/13378 (2013.01); G02F 1/134363 (2013.01); *G02F 2001/13706* (2013.01); *G02F 2001/13712* (2013.01); *G02F 2001/134372* (2013.01); *G02F 2202/06* (2013.01)

(58) Field of Classification Search
CPC .................... C09K 19/586; G02F 1/134363
See application file for complete search history.

(56) References Cited

U.S. PATENT DOCUMENTS

| | | | | |
|---|---|---|---|---|
| 5,124,824 | A | * | 6/1992 | Kozaki ............. G02F 1/133634 349/120 |
| 5,757,450 | A | * | 5/1998 | Fujii ..................... G02F 1/1345 349/106 |
| 7,251,008 | B2 | | 7/2007 | Maeda et al. |
| 7,576,829 | B2 | | 8/2009 | Kikuchi et al. |

(Continued)

FOREIGN PATENT DOCUMENTS

| | | |
|---|---|---|
| KR | 10-2006-0095129 | 8/2006 |
| KR | 10-0932211 | 12/2009 |

(Continued)

*Primary Examiner* — Sang V Nguyen
(74) *Attorney, Agent, or Firm* — H.C. Park & Associates, PLC

(57) ABSTRACT

A liquid crystal display includes: a first insulation substrate; a gate line and a data line formed on the first insulation substrate; a first electrode and a second electrode formed on the gate line and the data line and overlapping each other via an insulating layer interposed therebetween; a second insulation substrate facing the first insulation substrate; and a chiral dopant inserted between the first insulation substrate and the second insulation substrate. A content of the chiral dopant may be within about 1%, and liquid crystal molecules of a liquid crystal layer may be twisted with a pitch of about 10 μm to about 100 μm by the chiral dopant.

11 Claims, 12 Drawing Sheets

(56) References Cited

U.S. PATENT DOCUMENTS

| | | |
|---|---|---|
| 7,982,840 B2 | 7/2011 | Segawa et al. |
| 8,120,746 B2 | 2/2012 | Shibahara et al. |
| 8,202,584 B2 | 6/2012 | Klasen-Memmer et al. |
| 8,294,850 B2 | 10/2012 | Chen et al. |
| 2002/0149575 A1* | 10/2002 | Moon ............... G09G 3/3696 345/204 |
| 2008/0011983 A1 | 1/2008 | Lee et al. |
| 2009/0244425 A1* | 10/2009 | Jung ............... G02F 1/133753 349/48 |
| 2009/0244462 A1* | 10/2009 | Tsubata ............... G02F 1/1309 349/129 |
| 2011/0025935 A1* | 2/2011 | Oka ............... C09K 19/0258 349/33 |
| 2011/0141416 A1* | 6/2011 | Kim ............... C09K 19/56 349/123 |
| 2012/0162578 A1* | 6/2012 | Kim ............... G02F 1/1391 349/96 |
| 2012/0307177 A1 | 12/2012 | Manabe et al. |
| 2013/0258262 A1* | 10/2013 | Lee ............... G02F 1/133707 349/123 |
| 2013/0329149 A1* | 12/2013 | Jang ............... C09K 19/56 349/41 |
| 2014/0168577 A1* | 6/2014 | Choi ............... G02F 1/133553 349/96 |
| 2015/0301249 A1* | 10/2015 | Pau ............... G03F 7/001 349/124 |

FOREIGN PATENT DOCUMENTS

| | | |
|---|---|---|
| KR | 10-2012-0078127 | 7/2012 |
| KR | 10-2012-0119455 | 10/2012 |

* cited by examiner

LIQUID CRYSTAL DISPLAY

CROSS REFERENCE TO RELATED APPLICATION

This application claims priority from and the benefit of Korean Patent Application No. 10-2013-0121474 filed on Oct. 11, 2013, which is hereby incorporated by reference for all purposes as if fully set forth herein.

BACKGROUND

Field

Exemplary embodiments of the present invention relate to a liquid crystal display.

Discussion of the Background

A liquid crystal display, currently one of the most common types of flat panel displays, is a display device in which liquid crystal molecules of a liquid crystal layer are rearranged when voltage is applied to an electrode. This configuration controls an amount of transmitted light.

The liquid crystal display has an advantage of being thin, but has a disadvantage in that side visibility is reduced when compared with front visibility. As a result, various liquid crystal arrangements and driving methods have been developed in order to improve side visibility. As a method of implementing a wide viewing angle, a liquid crystal display in which a pixel electrode and a common electrode are disposed on one substrate has received attention.

In the liquid crystal display with an increased viewing angle, at least one of two field generating electrodes of the pixel electrode and the common electrode has a plurality of cutouts, and a plurality of branch electrodes defined by the plurality of cutouts.

However, when resolution of the liquid crystal display is increased, a size of a pixel is decreased, and thereby transmittance of the liquid crystal display may be decreased.

The above information disclosed in this Background section is only for enhancement of understanding of the background of the invention and therefore it may contain information that does not form the prior art that is already known in this country to a person of ordinary skill in the art.

SUMMARY

Exemplary embodiments of present invention provides a high resolution liquid crystal display in which transmittance deterioration is prevented when two field generating electrodes are disposed on one substrate and at least one of the two field generating electrodes has a cutout.

Additional features of the invention will be set forth in the description which follows, and in part will be apparent from the description, or may be learned by practice of the invention.

A liquid crystal display according to an exemplary embodiment of the present invention includes a first insulation substrate, a gate line and a data line disposed on the first insulation substrate, and a first electrode and a second electrode disposed on the gate line and the data line and overlapping each other via an insulating layer interposed therebetween. The exemplary embodiment of the present invention also includes a second insulation substrate facing the first insulation substrate and a liquid crystal layer including a chiral dopant inserted between the first insulation substrate and the second insulation substrate.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Figure 1:
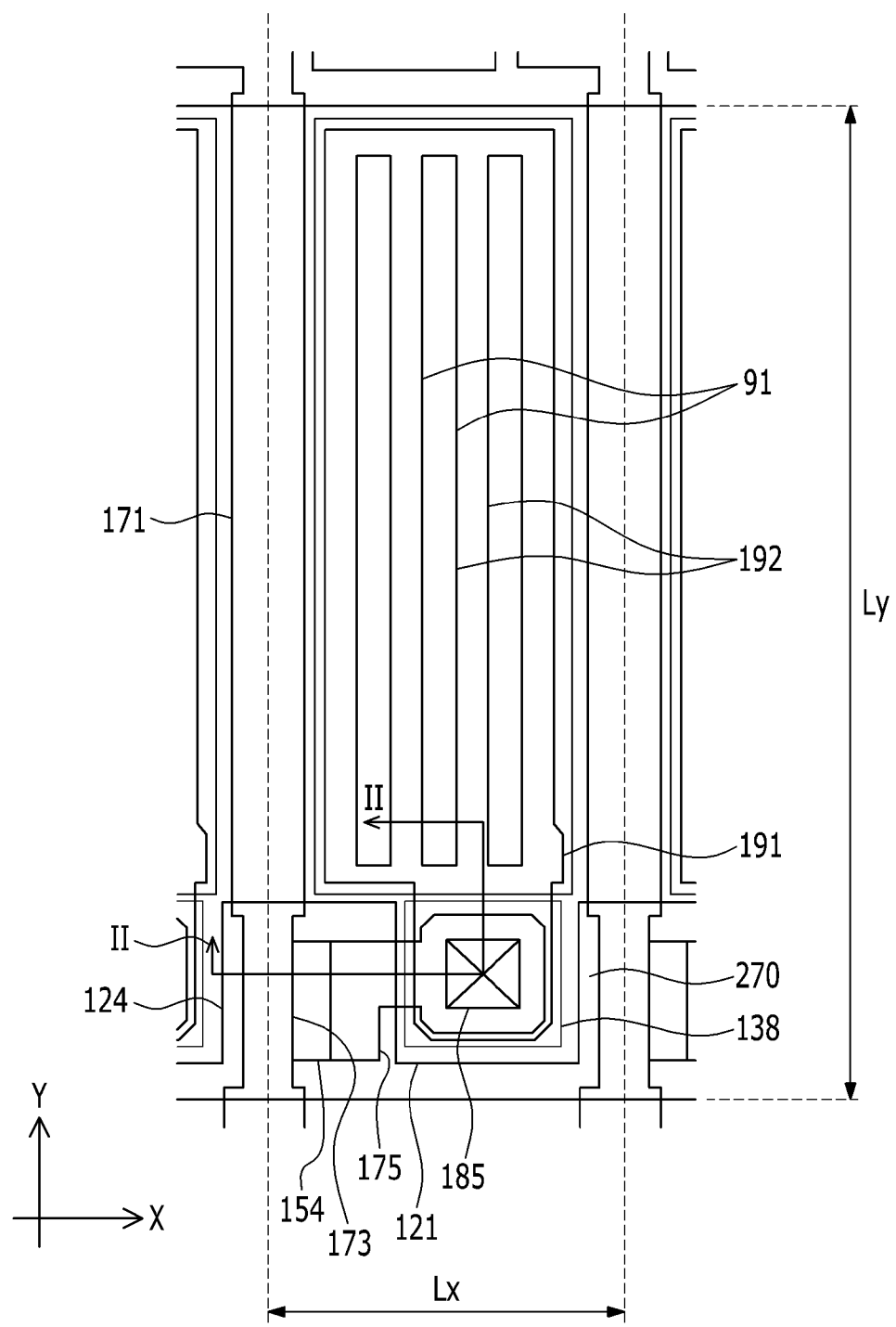
FIG. 1 is a layout view of a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A liquid crystal display according to an exemplary embodiment of the present invention will be described with reference to accompanying drawings.

A liquid crystal display according to an exemplary embodiment of the present invention will be described with reference to FIG. 1 and FIG. 2. FIG. 1 is a layout view of a liquid crystal display according to an exemplary embodiment of the present invention, and FIG. 2 is a cross-sectional view of the liquid crystal display of FIG. 1 taken along the line II-II.

Figure 2:
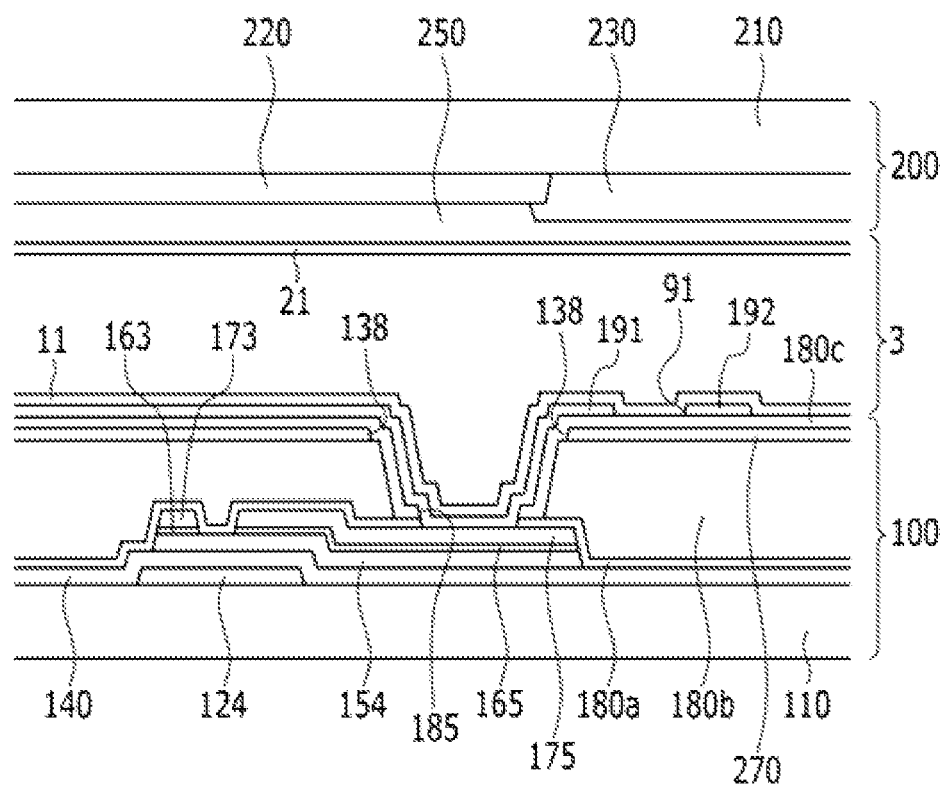
FIG. 2 is a cross-sectional view of the liquid crystal display of FIG. 1 taken along the line II-II.

First, referring to FIG. 1 and FIG. 2, the liquid crystal display according to the exemplary embodiment of the present invention includes a lower display panel 100 and an upper display panel 200 that face each other, and a liquid crystal layer 3 injected therebetween. One pixel area is described as an example below, and the liquid crystal display may have resolution of about 200 PPI or more. In other words, about 200 or more pixels may be included in a region of 1 inch in each direction in the liquid crystal display. Further, a width Lx of one pixel of the liquid crystal display according to the may be about 40 µm or less and a length Ly thereof may be about 120 µm or less. Herein, as shown in the drawings, the width Lx of the pixel is an interval between vertical center portions of the two adjacent data lines 171, and the length Ly of the pixel is an interval between horizontal center portions of two adjacent gate lines 121.

With regard to the lower display panel 100, gate conductors, including the gate line 121 and a gate electrode 124, are disposed on an insulating substrate 110. The insulating substrate 110 may include transparent glass, plastics, or other suitable transparent materials.

The gate line 121 includes the gate electrode 124 and a wide end portion (not shown) for connection with another layer or an external driving circuit. The gate line 121 may include aluminum (Al) or an aluminum alloy, silver (Ag) or a silver alloy, copper (Cu) or a copper alloy, molybdenum (Mo) or a molybdenum alloy, chromium (Cr), tantalum (Ta), and/or titanium (Ti). The gate line 121 may have a multilayered structure including at least two conductive layers having different physical properties.

A gate insulating layer 140 including of a silicon nitride (SiNx), a silicon oxide (SiOx), or another suitable material, is disposed on the gate conductor 121. The gate insulating layer 140 may have a multilayered structure including at least two insulating layers having different physical properties.

A semiconductor 154 made of amorphous silicon, polysilicon, or another suitable material is disposed on the gate insulating layer 140. The semiconductor 154 may include an oxide semiconductor.

Ohmic contacts 163 and 165 are disposed on the semiconductor 154. The ohmic contacts 163 and 165 may be made of a material such as n+ hydrogenated amorphous silicon to which an n-type impurity, such as phosphorus, is doped at a high concentration, or of a silicide. The ohmic contacts 163 and 165 may be disposed on the semiconductor 154. In the case where the semiconductor 154 is the oxide semiconductor, the ohmic contacts 163 and 165 may be omitted.

A data conductor including the data line 171, including a source electrode 173 and a drain electrode 175, is disposed the ohmic contacts 163 and 165 and the gate insulating layer 140.

The data line 171 includes a wide end portion (not shown) for connection with another layer or an external driving circuit. The data line 171 transports a data signal and extends in a substantially vertical direction, crossing the gate line 121.

The source electrode 173 is connected to the data line 171, and is disposed on the same line as the data line 171. The drain electrode 175 is disposed parallel to the source electrode 173. Accordingly, the drain electrode 175 is parallel to a portion of the data line 171.

The gate electrode 124, the source electrode 173, and the drain electrode 175 form a thin film transistor (TFT) in conjunction with the semiconductor 154. A channel of the thin film transistor is disposed in the semiconductor 154 between the source electrode 173 and drain electrode 175.

The liquid crystal display may include the source electrode 173 on the same line as the data line 171, and the drain electrode 175 may be parallel to the data line 171. This configuration may increase a width of the thin film transistor without increasing the area of the data conductor, thus increasing the aperture ratio of the liquid crystal display.

The data line 171 and the drain electrode 175 may be made of a refractory metal that may include at least one of molybdenum, chromium, tantalum, titanium, and alloys thereof, and may have a multilayered structure including a refractory metal layer (not shown) and a low resistance conductive layer (not shown). Examples of the multilayered structure may include a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer. However, the data line 171 and the drain electrode 175 may be made of various metals or conductors in addition to this.

A first passivation layer 180a is disposed on the data conductors 171, 173, and 175, the gate insulating layer 140, and exposed portions of the semiconductor 154. The first passivation layer 180a may include an organic insulating material, an inorganic insulating material, or another suitable material.

A second passivation layer 180b is disposed on the first passivation layer 180a. The second passivation layer 180b may be omitted. The second passivation layer 180b may be a color filter. In the case where the second passivation layer 180b is the color filter, the second passivation layer 180b may intrinsically display any one of primary colors. Examples of the primary colors may include three primary colors, such as red, green, and blue, yellow, cyan, and magenta, or the like. Although not shown in the drawings, the color filter may further include a color filter displaying a mixed color of the primary colors or white in addition to the primary colors.

A common electrode 270 is disposed on the second passivation layer 180b. The common electrode 270 may have a planar shape and be disposed on the entire surface of the substrate 110. The common electrode 270 may have an opening 138 disposed in a region corresponding to the circumference of the drain electrode 175. That is, the common electrode 270 may have a flat surface of a plate shape.

The common electrodes 270 disposed in adjacent pixels may be connected to each other to receive a common voltage supplied from the outside of the display region.

A third passivation layer 180c is disposed on the common electrode 270. The third passivation layer 180c may include an organic insulating material, an inorganic insulating material, or another suitable material.

A pixel electrode 191 is disposed on the third passivation layer 180c. The pixel electrode 191 has a plurality of first cutouts 91, and includes a plurality of first branch electrodes 192 that are at least partially defined by the plurality of first cutouts 91.

The first branch electrode 192 is disposed substantially parallel to a longitudinal reference line (a reference line extending in a y direction) forming an 90 degree angle with respect to a direction (an x direction) that the gate line 121 extends.

The first passivation layer 180a, the second passivation layer 180b, and the third passivation layer 180c have a first contact hole 185 exposing the drain electrode 175. The pixel electrode 191 is physically and electrically connected to the drain electrode 175 through the first contact hole 185 to receive a voltage from the drain electrode 175.

A first alignment layer 11 may be disposed on the pixel electrode 191 and the third passivation layer 180c. The first alignment layer 11 may be a horizontal alignment layer, and it may be rubbed in a direction. However, in the liquid crystal display according to another exemplary embodiment of the present invention, the alignment layer may include a photoreactive material that is photoaligned.

With regard to the upper display panel 200, a light blocking member 220 is disposed on an insulating substrate 210 made of transparent glass, plastic, or another suitable transparent material. The light blocking member 220 may also be a black matrix that prevents light leakage.

A plurality of color filters 230 are disposed on the substrate 210. In the case where the second passivation layer 180b of the lower display panel 100 is a color filter, the color filter 230 of the upper display panel 200 may be omitted. Further, the light blocking member 220 of the upper display panel 200 may also be disposed in the lower display panel 100.

An overcoat 250 is disposed on the color filter 230 and the light blocking member 220. The overcoat 250 includes an organic insulator, prevents exposure of the color filter 230, and provides a flat surface. The overcoat 250 may be omitted.

A second alignment layer 21 may be disposed on the overcoat 250. The liquid crystal layer 3 includes a liquid crystal material having positive or negative dielectric anisotropy and a chiral dopant. Liquid crystal molecules of the liquid crystal layer 3 are arranged so that a long axis direction is approximately parallel to the display panels 100 and 200, and are arranged to have pretilt angle in the alignment direction of the first alignment layer 11 and the second alignment layer 21.

When the liquid crystal molecules of the liquid crystal layer 3 have a negative dielectric anisotropy, the dielectric anisotropy ($\Delta\epsilon$) of the liquid crystal layer 3 is about −2.5 to about −4.5, the refractive anisotropy ($\Delta n$) of the liquid crystal layer 3 is about 0.100 to about 0.130, and the rotation viscosity ($\gamma 1$) of the liquid crystal layer 3 is about 50 to about 100.

When the liquid crystal molecules of the liquid crystal layer 3 have positive dielectric anisotropy, the dielectric anisotropy ($\Delta\epsilon$) of the liquid crystal layer 3 is about 4 to about 14, the refractive anisotropy ($\Delta n$) of the liquid crystal layer 3 is about 0.100 to about 0.130, and the rotation viscosity ($\gamma 1$) of the liquid crystal layer 3 is about 50 to about 100.

The liquid crystal layer 3 includes about 1% by weight of the chiral dopant, based on the total weight of the liquid crystal layer. Because of the chiral dopant, the liquid crystal molecules of the liquid crystal layer 3 are twisted and arranged while having directivity. The liquid crystal molecules of the liquid crystal layer 3 may be twisted with a pitch of about 10 μm to about 100 μm. Also, the liquid crystal molecules of the liquid crystal layer 3 may be twisted in a counterclockwise direction or a clockwise direction according to a right-handed rotator or a left-handed rotator of the chiral dopant.

The pixel electrode 191 receives the data voltage from the drain electrode 175, and the common electrode 270 receives the common voltage from the common voltage applying unit, which is disposed outside the display region.

The pixel electrode 191 and the common electrode 270, which are the field generating electrodes, generate an electric field such that the liquid crystal molecules of the liquid crystal layer 3 positioned on the two field generating electrodes 191 and 270 rotate in a direction parallel with a direction of the electric field. The polarization of light passing through the liquid crystal layer 3 is changed according to the rotating direction of the liquid crystal molecules determined as described above. In detail, when the liquid crystal layer 3 has the positive dielectric anisotropy, the long axis of the liquid crystal molecule is rotated in a direction parallel to the direction of the electric field, and when the liquid crystal layer 3 has the negative dielectric anisotropy, the long axis of the liquid crystal molecule is rotated in a direction perpendicular to the direction of the electric field.

By twisting the arrangement of the liquid crystal molecules using the chiral dopant, the liquid crystal molecules are quickly rotated to the direction of the electric field in the region where an intensity of the electric field is relatively smaller, such that transmittance of the liquid crystal display is increased and response speed may be increased.

This will be described in detail with reference to FIG. 3A to FIG. 3D. FIG. 3A to FIG. 3D are views to explain an operation of a liquid crystal display according to an exemplary embodiment of the present invention.

Figure 3A:
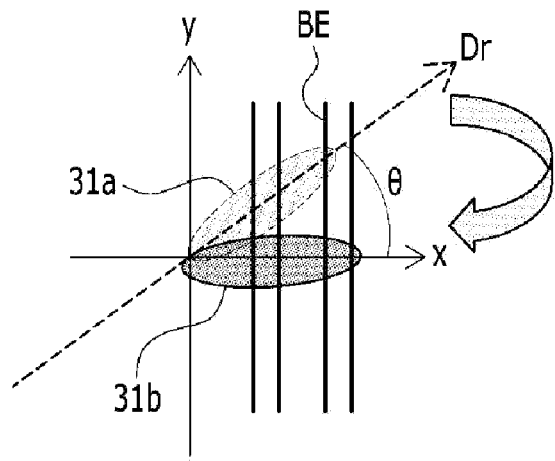
FIGS. 3A, 3B, 3C, and 3D are views to explain an operation of a liquid crystal display according to an exemplary embodiment of the present invention.
Figure 3B:
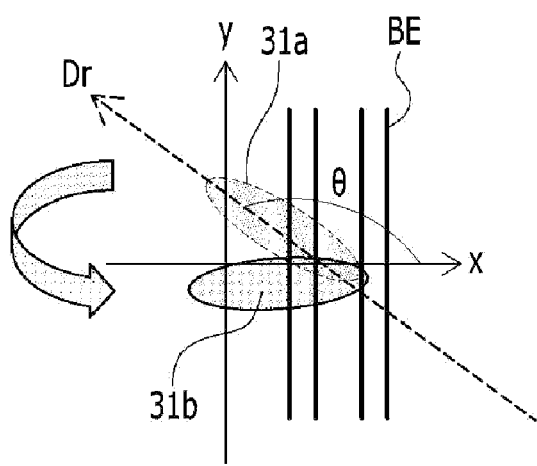
Figure 3C:
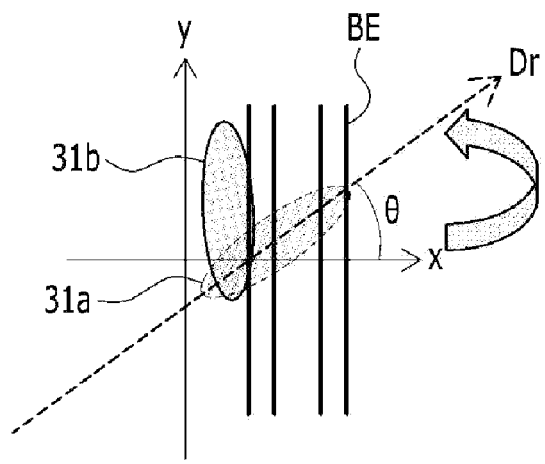

Referring to FIG. 3C, the liquid crystal layer 3 has negative dielectric anisotropy and the liquid crystal molecules are arranged to have a pretilt angle (θ), where 0°<θ<90°, with respect to the direction x that the gate line 121 extends, and are therefore arranged in a direction of a first liquid crystal molecule 31a. At this time, the chiral dopant has the right-handed rotator such that the liquid crystal molecules are twisted in the counterclockwise direction (the direction of the arrow of FIG. 3C) from the direction of the first liquid crystal molecule 31a.

If a plurality of branch electrodes (BE) are applied with a voltage, such that the electric field is generated in the direction perpendicular to the length direction of the plurality of branch electrodes (BE), the liquid crystal molecules are rotated in the direction perpendicular to the direction of the electric field and are rotated into a position of a second liquid crystal molecule 31b. That is, the liquid crystal molecules are rotated to be substantially parallel to the length direction of the plurality of branch electrodes (BE).

As described above, the chiral dopant has the right-handed rotator such that the liquid crystal molecules are twisted from the direction of the first liquid crystal molecule 31a in the counterclockwise direction, and this direction is almost the same as the direction of the second liquid crystal molecule 31b. Accordingly, like a region positioned with the same interval from two adjacent branch electrodes (BE), the liquid crystal molecules positioned in the region where the intensity of the electric field is relatively weak may be quickly rotated in the direction of the second liquid crystal molecule 31b by the directivity of the chiral dopant.

Accordingly, the transmittance of the liquid crystal display is high and the response speed is fast.

Figure 3D:
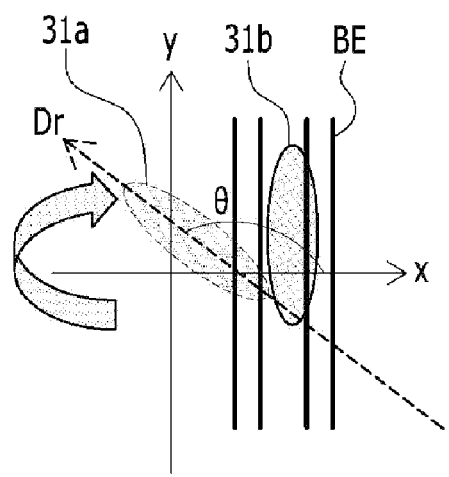

Next, referring to FIG. 3D, the liquid crystal layer 3 has negative dielectric anisotropy and the liquid crystal molecules are arranged to have a pretilt angle (θ), where 90°<θ<180°, with respect to the direction x that the gate line 121 extends, and are therefore arranged in the direction of the first liquid crystal molecule 31a. At this time, the chiral dopant has the left-handed rotator, such that the liquid crystal molecules are twisted in the clockwise direction (the direction of the arrow of FIG. 3D) from the direction of the first liquid crystal molecule 31a.

If the plurality of branch electrodes (BE) are applied with a voltage, such that the electric field is generated in the direction perpendicular to the length direction of the plurality of branch electrodes (BE), the liquid crystal molecules are rotated in the direction perpendicular to the direction of the electric field and are rotated into the position of the second liquid crystal molecule 31b. That is, they are rotated in the direction parallel to the length direction of the plurality of branch electrodes (BE).

As described above, the chiral dopant has the left-handed rotator, such that the liquid crystal molecules are twisted from the direction of the first liquid crystal molecule 31a in the clockwise direction, and this direction is almost the same as the direction of the second liquid crystal molecule 31b. Accordingly, like a region positioned with the same interval from two adjacent branch electrodes (BE), the liquid crystal molecules positioned in the region where the intensity of the electric field is relatively weak may be speedily rotated in the direction of the second liquid crystal molecule 31b, by the directivity of the chiral dopant.

Accordingly, the transmittance of the liquid crystal display is high and the response speed is fast.

Referring to FIG. 3A, the liquid crystal layer 3 has positive dielectric anisotropy and the liquid crystal molecules are arranged to have a pretilt angle (e), where $0°<\theta<90°$, with respect to the direction x that the gate line 121 extends in, being therefore arranged in the direction of the first liquid crystal molecule 31a. At this time, the chiral dopant has the left-handed rotator such that the liquid crystal molecules are twisted in the clockwise direction from the direction of the first liquid crystal molecule 31a.

If the plurality of branch electrodes (BE) are applied with a voltage, such that the electric field is generated in the direction perpendicular to the length direction of the plurality of branch electrodes (BE), the liquid crystal molecules are rotated in the direction parallel to the direction of the electric field and are rotated into the position of the second liquid crystal molecule 31b. That is, they are rotated in the direction perpendicular to the length direction of the plurality of branch electrodes (BE).

As described above, the chiral dopant has the left-handed rotator such that the liquid crystal molecules are twisted from the direction of the first liquid crystal molecule 31a in the clockwise direction, and this direction is almost the same as the direction of the second liquid crystal molecule 31b. Accordingly, like a region positioned with the same interval from two adjacent branch electrodes (BE), the liquid crystal molecules positioned in the region where the intensity of the electric field is relatively weak may be quickly rotated in the direction of the second liquid crystal molecule 31b by the directivity of the chiral dopant.

Accordingly, the transmittance of the liquid crystal display is high and the response speed is fast.

Next, referring to FIG. 3B, the liquid crystal layer 3 has positive dielectric anisotropy and the liquid crystal molecules are arranged to have the pretilt angle (θ), where $90°<\theta<180°$, with respect to the direction x that the gate line 121 extends, thereby being arranged in the direction of the first liquid crystal molecule 31a. At this time, the chiral dopant has the right-handed rotator such that the liquid crystal molecules are twisted in the counterclockwise direction from the direction of the first liquid crystal molecule 31a.

If the plurality of branch electrodes (BE) are applied with the voltage, such that the electric field is generated in the direction parallel to the length direction of the plurality of branch electrodes (BE), the liquid crystal molecules are rotated in the direction parallel to the direction of the electric field and are rotated into the position of the second liquid crystal molecule 31b. That is, they are rotated in the direction perpendicular to the length direction of the plurality of branch electrodes (BE).

As described above, the chiral dopant has the right-handed rotator, such that the liquid crystal molecules are twisted from the direction of the first liquid crystal molecule 31a in the counterclockwise direction, and this direction is almost the same as the direction of the second liquid crystal molecule 31b. Accordingly, like a region positioned with the same interval from two adjacent branch electrodes (BE), the liquid crystal molecules positioned in the region where the intensity of the electric field is relatively weak may be quickly rotated in the direction of the second liquid crystal molecule 31b, by the directivity of the chiral dopant.

Accordingly, the transmittance of the liquid crystal display is high and the response speed is fast.

Figure 4A:
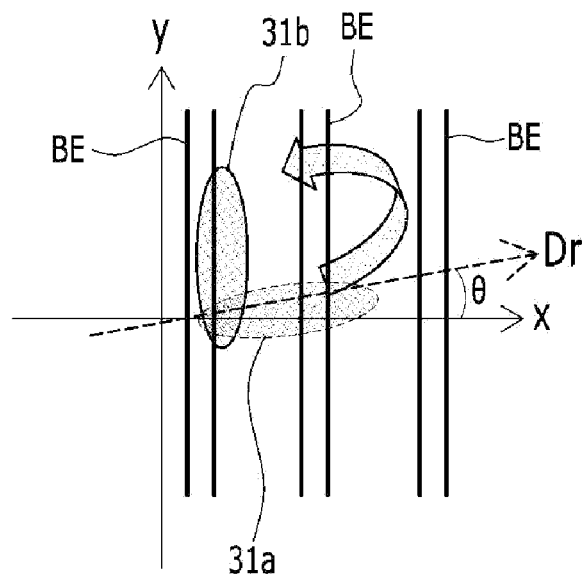
FIG. 4A is a view to explain an operation of the liquid crystal display shown in FIG. 4B.
Figure 4B:
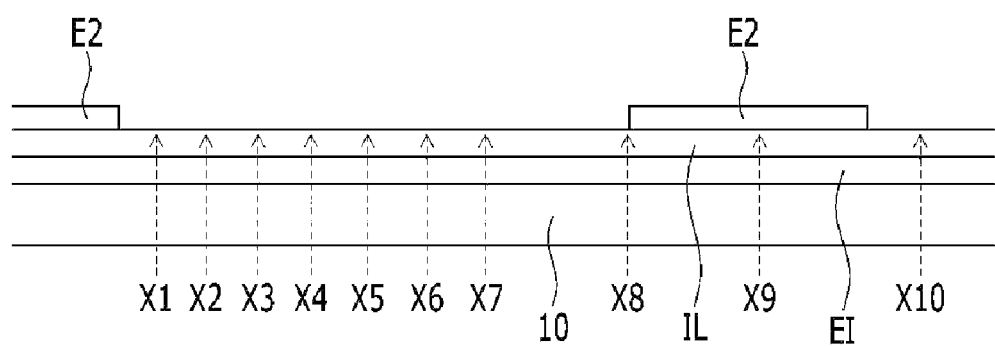
FIG. 4B is a schematic view to explain a condition of one experimental example of the present invention.

Next, one experimental example of the present invention will be described with reference to FIGS. 4A and 4B. FIGS. 4A and 4B are a schematic view to explain a condition of one experimental example of the present invention.

In the present experimental example, like that shown in FIG. 3C, the liquid crystal molecules having the negative dielectric anisotropy are used. The liquid crystal molecules are arranged to have a pretilt in a direction forming an about 5° angle with respect to the direction that the gate line extends. The chiral dopant having the right-handed rotator is used and a cell gap of the liquid crystal layer is about 1 μm to about 1.3 μm. The first field generating electrode E1 of the first field generating electrode E1 and the second field generating electrode E2, together with an insulating layer (IL) interposed therebetween, has a flat surface and a plate shape. The second field generating electrode E2 has a plurality of branch electrodes. The plurality of branch electrodes of the second field generating electrode E2 are disposed at an interval of about 5 μm.

The twist angle of the liquid crystal molecule is measured with respect to the direction that the gate line extends, at a first position X1 disposed about 0.5 μm from one edge among two adjacent branch electrodes of the second field generating electrode E2, a second position X2 disposed about 1.0 μm from the edge, a third position X3 disposed about 1.5 μm from the edge, a fourth position X4 disposed about 2.0 μm from the edge, a fifth position X5 disposed about 2.5 μm from the edge, a sixth position X6 disposed about 3.0 μm from the edge, a seventh position X7 disposed about 3.5 μm from the edge, an eighth position X8 of the other edge of two adjacent branch electrodes, a ninth position X9 of an opposite edge of the other of the two adjacent branch electrodes, and a tenth position X10 disposed about 1 μm from the opposite edge of the other of two adjacent branch electrodes. Based on a control case 1, in which the chiral dopant is not included, for a case 2 in which the twist pitch of the liquid crystal molecule by the chiral dopant is about 10 μm, a case 3 of about 30 μm, a case 4 of about 50 μm, a case 5 of about 70 μm, and a case 6 of about 100 μm, the twist angle is measured and the result is shown in Table 1.

TABLE 1

| | Position | | | | | | | | | |
|---|---|---|---|---|---|---|---|---|---|---|
| | X1 | X2 | X3 | X4 | X5 | X6 | X7 | X8 | X9 | X10 |
| Case 1 | 50.0 | 40.8 | 35.0 | 33.0 | 35.2 | 41.2 | 50.4 | 48.3 | 48.8 | 50.0 |
| Case 2 | 51.4 | 42.6 | 37.2 | 35.3 | 37.4 | 42.9 | 51.8 | 50.9 | 51.3 | 51.5 |
| Case 3 | 50.5 | 41.5 | 35.8 | 33.9 | 36.1 | 41.8 | 50.8 | 49.1 | 49.6 | 50.5 |
| Case 4 | 50.3 | 41.2 | 35.5 | 33.6 | 35.7 | 41.6 | 50.7 | 48.8 | 49.3 | 50.3 |
| Case 5 | 50.2 | 41.1 | 35.4 | 33.4 | 35.6 | 41.5 | 50.6 | 48.6 | 49.1 | 50.2 |
| Case 6 | 50.1 | 41.0 | 35.3 | 33.3 | 35.5 | 41.4 | 50.6 | 48.5 | 49.0 | 50.2 |

Referring to Table 1, compared with the control case 1 in which the chiral dopant is not included in the liquid crystal layer, in cases 2-6, in which the liquid crystal molecules have the twist arrangement, the arrangement angle of the liquid crystal molecules is close to the direction in which the branch electrodes (BE) are extended. Particularly, the position where two adjacent branch electrodes (BE) are separated with an interval such that the intensity of the electric field is small, for example, at the third position X3, the fourth position X4, and the fifth position X5, the arrangement angle of the liquid crystal molecules is also close to the direction where the branch electrodes (BE) are extended. Accordingly, if the electric field is applied to the liquid crystal display, the liquid crystal molecules may be quickly rotated according to the direction in which the branch electrodes (BE) are extended. Accordingly, the transmittance of the liquid crystal display is increased and the response speed of the liquid crystal display is high.

Figure 5:
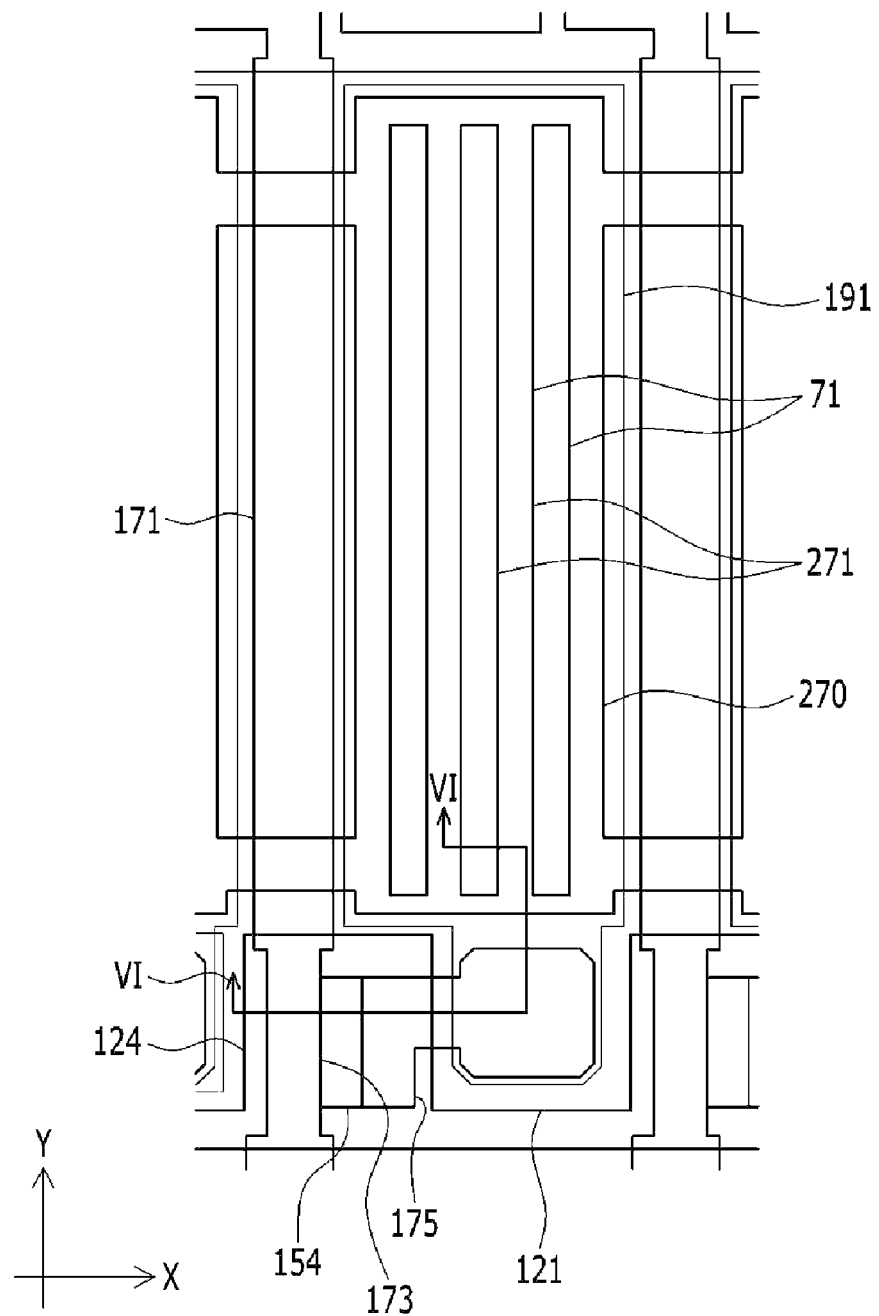
FIG. 5 is a layout view of a liquid crystal display according to another exemplary embodiment of the present invention.

Next, a liquid crystal display according to another exemplary embodiment of the present invention will be described with reference to FIG. 5 and FIG. 6. FIG. 5 is a layout view of a liquid crystal display according to another exemplary embodiment of the present invention, and FIG. 6 is a cross-sectional view of the liquid crystal display of FIG. 5 taken along the line VI-VI.

Figure 6:
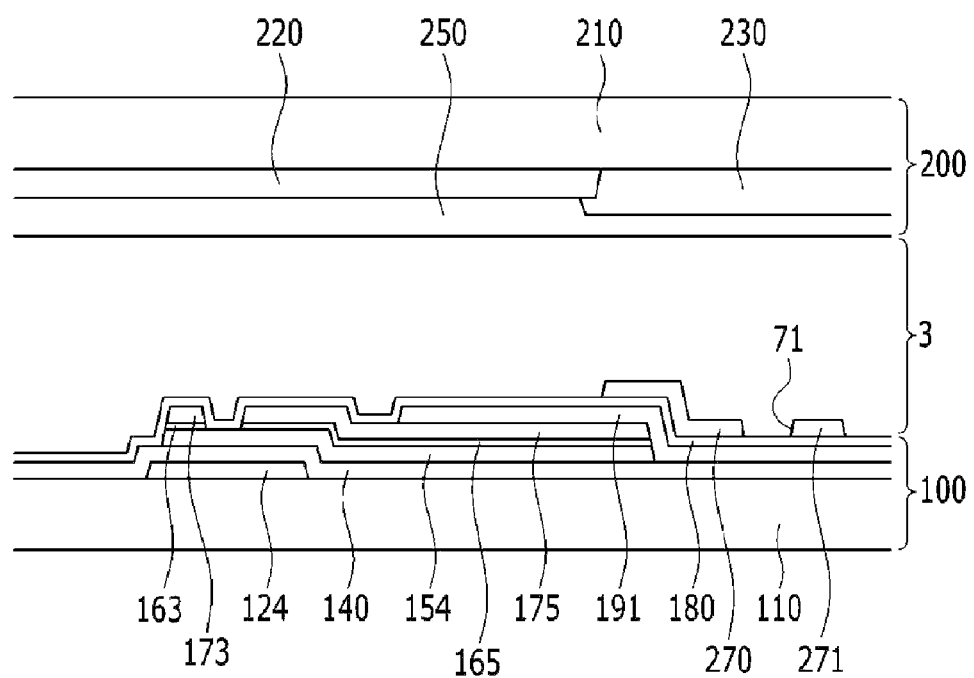
FIG. 6 is a cross-sectional view of the liquid crystal display of FIG. 5 taken along the line VI-VI.

Referring to FIG. 5 and FIG. 6, the liquid crystal display according to the present exemplary embodiment is similar to the liquid crystal display according to the exemplary embodiment shown in FIG. 1 and FIG. 2. Accordingly, similar elements have the same reference numbers.

Referring to FIG. 5 and FIG. 6, the liquid crystal includes the lower display panel 100 and the upper display panel 200 that face each other, and the liquid crystal layer 3 injected therebetween.

With regard to the lower display panel 100, the gate conductors 121 and 124, including the gate line 121 and a gate electrode 124, are disposed on the insulating substrate 110, and the gate insulating layer 140 is disposed on the gate conductors 121 and 124.

The semiconductor 154 is disposed on the gate insulating layer 140. The ohmic contacts 163 and 165 are disposed on the semiconductor 154. In the case where the semiconductor 154 is the oxide semiconductor, the ohmic contacts 163 and 165 may be omitted.

The data conductor including the data line 171 including the source electrode 173 and the drain electrode 175 is disposed on the ohmic contacts 163 and 165 and the gate insulating layer 140.

The pixel electrode 191 is disposed directly on the drain electrode 175. The pixel electrode 191 is disposed in one pixel region to have a planar shape, that is, a plate shape.

A passivation layer 180 is disposed on the data conductors 171, 173, and 175, the gate insulating layer 140, the exposed portion of the semiconductor 154, and the pixel electrode 191. However, in the liquid crystal display according to another exemplary embodiment of the present invention, the passivation layer 180 may be disposed between the pixel electrode 191 and the data line 171, and the pixel electrode 191 may be connected through the contact hole (not shown) disposed in the passivation layer 180 to the drain electrode 175.

The common electrodes 270 are disposed on the passivation layer 180. The common electrodes 270 are connected to each other and receive the common voltage from the common voltage application portion disposed outside of the display region.

The common electrode 270 has a plurality of second cutouts 71, and includes a plurality of second branch electrodes 271 defined by the second cutouts 71.

The second branch electrodes 271 of the common electrode 270 extend approximately parallel to the longitudinal reference line (the reference line extending in the y direction) forming the angle 90 degrees with respect to the direction (the x direction) that the gate line 121 extends.

The first alignment layer (not shown) is disposed on the common electrode 270 and the passivation layer 180. The first alignment layer may be the horizontal alignment layer, and may be rubbed in a direction. However, in the liquid crystal display according to another exemplary embodiment of the present invention, the alignment layer may include a photoreactive material to be photo-aligned.

The light blocking member 220 is disposed on the insulating substrate 210. A plurality of color filters 230 is disposed on the substrate 210. In the case where the color filters 230 are disposed in the lower display panel 100, the light blocking member 220 may also be disposed in the lower display panel 100.

The overcoat 250 is disposed on the color filter 230 and the light blocking member 220. The overcoat 250 may be omitted. The second alignment layer (not shown) may be disposed on the overcoat 250.

The liquid crystal layer 3 includes the liquid crystal material having the positive or negative dielectric anisotropy and the chiral dopant. The liquid crystal molecules of the liquid crystal layer 3 are arranged so that a long axis direction thereof is approximately parallel to the display panels 100 and 200, and are arranged to have a pretilt direction by the alignment direction of the first alignment layer and the second alignment layer.

When the liquid crystal molecules of liquid crystal layer 3 have negative dielectric anisotropy, the dielectric anisotropy ($\Delta\varepsilon$) of the liquid crystal layer 3 is about −2.5 to about −4.5, the refractive anisotropy ($\Delta n$) of the liquid crystal layer 3 is about 0.100 to about 0.130, and the rotation viscosity ($\gamma 1$) of the liquid crystal layer 3 is about 50 to about 100.

When the liquid crystal molecules of liquid crystal layer 3 have positive dielectric anisotropy, the dielectric anisotropy ($\Delta\varepsilon$) of the liquid crystal layer 3 is about 4 to about 14, the refractive anisotropy (Δn) of the liquid crystal layer 3 is about 0.100 to about 0.130, and the rotation viscosity (γ1) of the liquid crystal layer 3 is about 50 to about 100.

The chiral dopant included in the liquid crystal layer 3 accounts for approximately 1% or less by weight of the liquid crystal layer. By the chiral dopant, the liquid crystal molecules of the liquid crystal layer 3 are twisted and arranged while having directivity. The liquid crystal molecules of the liquid crystal layer 3 may be twisted with a pitch of about 10 μm to about 100 μm. Also, the liquid crystal molecules of the liquid crystal layer 3 may be twisted in a counterclockwise direction or a clockwise direction according to a right-handed rotator or a left-handed rotator of the chiral dopant. Accordingly, if the electric field is applied to the liquid crystal display, the liquid crystal molecules may be quickly rotated according to the direction in which the branch electrodes (BE) are extended. Accordingly, the transmittance of the liquid crystal display is increased and the response speed of the liquid crystal display is high.

Many characteristics of the liquid crystal display according to the exemplary embodiment shown in FIG. 1 and FIG. 2 may be applied to the liquid crystal display according to the present exemplary embodiment.

Figure 7:
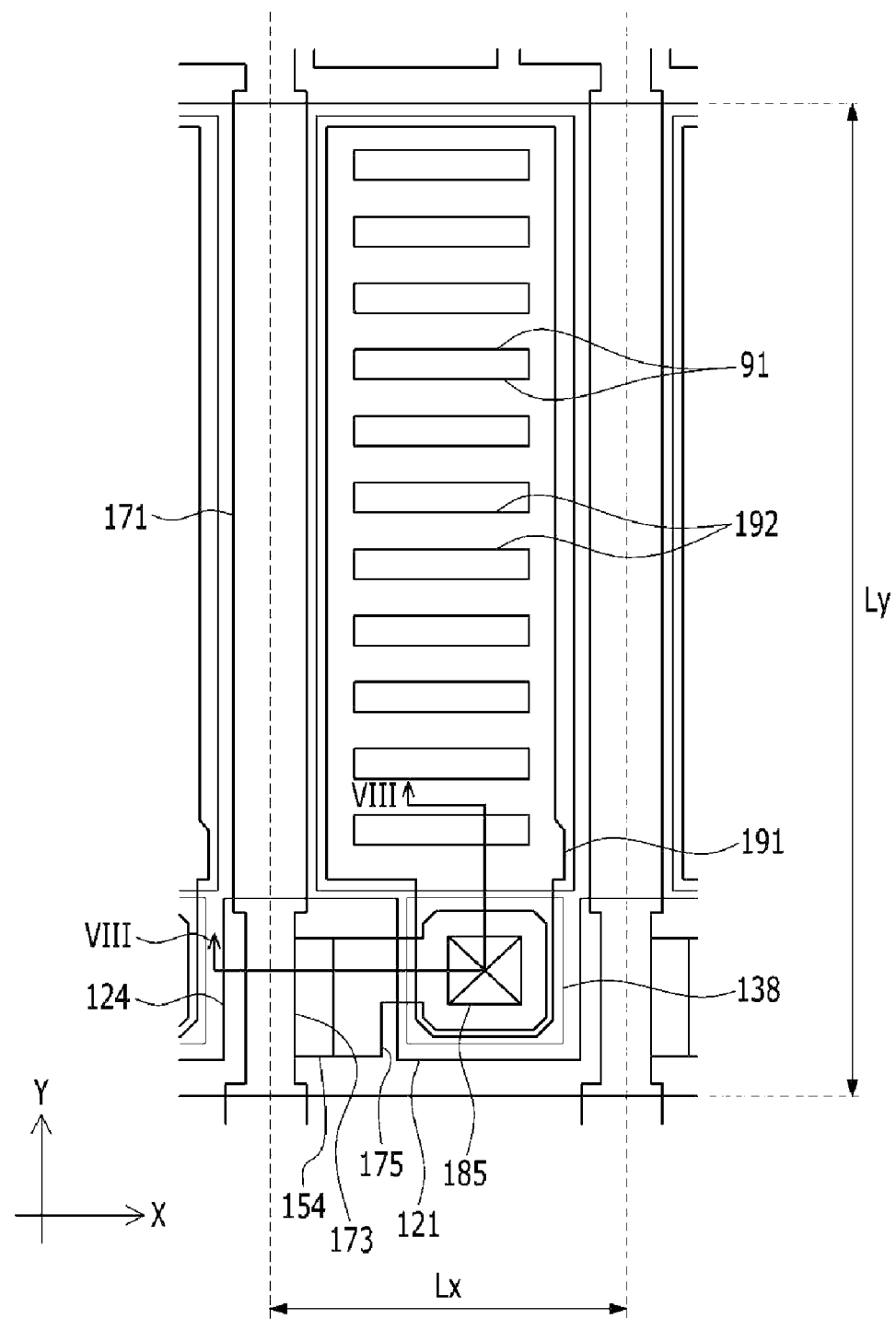
FIG. 7 is a layout view of a liquid crystal display according to another exemplary embodiment of the present invention.

Next, a liquid crystal display according to another exemplary embodiment of the present invention will be described with reference to FIG. 7 and FIG. 8. FIG. 7 is a layout view of a liquid crystal display according to another exemplary embodiment of the present invention, and FIG. 8 is a cross-sectional view of the liquid crystal display of FIG. 7 taken along the line VIII-VIII.

Figure 8:
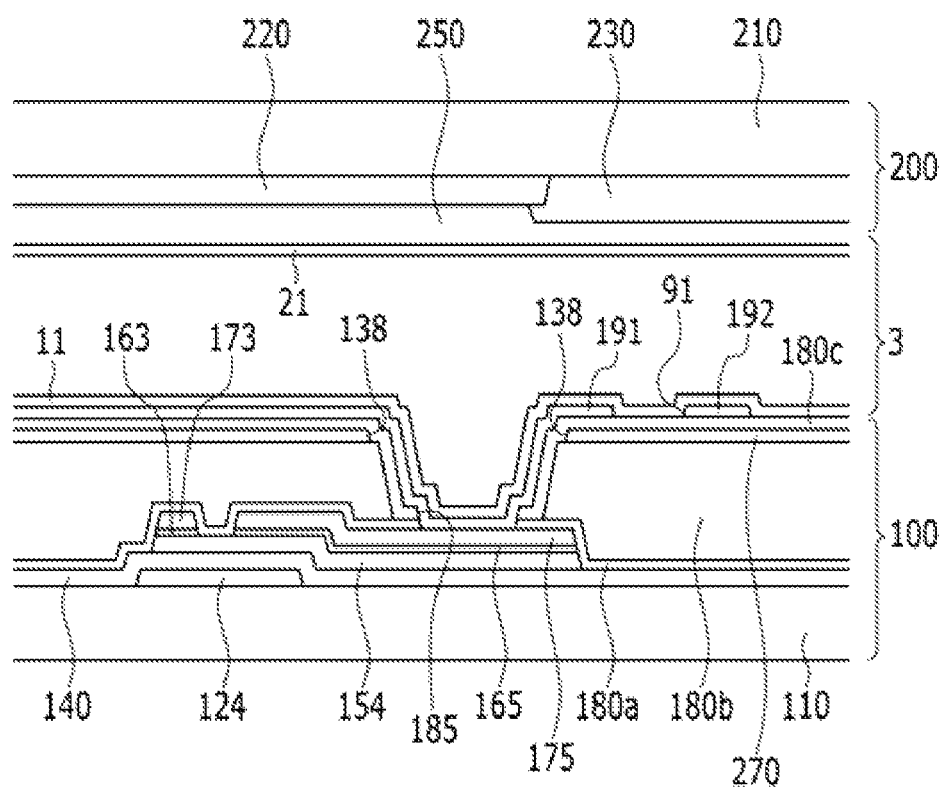
FIG. 8 is a cross-sectional view of the liquid crystal display of FIG. 7 taken along the line VIII-VIII.

Referring to FIG. 7 and FIG. 8, the liquid crystal display includes the lower display panel 100 and the upper display panel 200 that face each other, and the liquid crystal layer 3 injected therebetween.

The gate conductors 121 and 124 including the gate line 121 and the gate electrode 124 are disposed on the insulating substrate 110, and the gate insulating layer 140 is disposed on the gate conductor 121 and 124.

The semiconductor 154 is disposed on the gate insulating layer 140. The ohmic contacts 163 and 165 are disposed on the semiconductor 154. In the case where the semiconductor 154 is the oxide semiconductor, the ohmic contacts 163 and 165 may be omitted.

The data conductor including the data line 171 including the source electrode 173 and the drain electrode 175 is disposed on the ohmic contacts 163 and 165 and the gate insulating layer 140.

The first passivation layer 180a is disposed on the data conductors 171, 173, and 175, the gate insulating layer 140, and the exposed portion of the semiconductor 154. The first passivation layer 180a may be made of the organic insulating material or the inorganic insulating material.

The second passivation layer 180b is disposed on the first passivation layer 180a. The second passivation layer 180b may be omitted. The second passivation layer 180b may be the color filter.

The common electrode 270 is disposed on the second passivation layer 180b. The common electrode 270 may have a planar shape and may be disposed on the entire surface of the substrate 110 to have a planar shape. Opening 138 in common electrode 270 may be disposed in a region corresponding to the circumference of the drain electrode 175. That is, the common electrode 270 may have the flat plate shape.

The common electrodes 270 disposed in adjacent pixels may be connected to each other to receive a common voltage supplied from outside of the display region.

The third passivation layer 180c is disposed on the common electrode 270. The third passivation layer 180c may include organic insulating material or the inorganic insulating material.

The pixel electrode 191 is disposed on the third passivation layer 180c. The pixel electrode 191 has the plurality of first cutouts 91, and includes the plurality of first branch electrodes 192 defined by the plurality of first cutouts 91.

In the liquid crystal display according to the present exemplary embodiment, and departing from the liquid crystal display according to the exemplary embodiment shown in FIG. 1 and FIG. 2, the plurality of first branch electrodes 192 of the pixel electrode 191 of the liquid crystal display according to the present exemplary embodiment extend parallel to the direction (the x direction) that the gate line 121 extends.

The first passivation layer 180a, the second passivation layer 180b, and the third passivation layer 180c have the first contact hole 185 exposing the drain electrode 175. The pixel electrode 191 is physically and electrically connected to the drain electrode 175 through the first contact hole 185, and may receive a voltage from the drain electrode 175.

An alignment layer 11 may be disposed on the pixel electrode 191 and the third passivation layer 180c. Alignment layer 11 may be a horizontal alignment layer, and it may be rubbed in a direction. However, in the liquid crystal display according to another exemplary embodiment of the present invention, the alignment layer may include a photoreactive material to be photo-aligned.

Regarding upper display panel 200, the light blocking member 220 is disposed on the insulating substrate 210. The plurality of color filters 230 are disposed on the substrate 210. The color filters 230 may be disposed in the lower display panel 100, and in this case, the light blocking member 220 may also be disposed in the lower panel 100.

The overcoat 250 is disposed on the color filter 230 and the light blocking member 220. The overcoat 250 may be omitted. The second alignment layer 21 is disposed on the overcoat 250.

The liquid crystal layer 3 includes the liquid crystal material having the positive or negative dielectric anisotropy and the chiral dopant. The liquid crystal molecules of the liquid crystal layer 3 are arranged so that a long axis direction of the liquid crystal molecules is approximately parallel to the display panels 100 and 200, and are arranged to have a pretilt in the alignment direction of the first alignment layer 11 and the second alignment layer 21.

When the liquid crystal layer 3 has negative dielectric anisotropy, the dielectric anisotropy (Δε) of the liquid crystal layer 3 is about −2.5 to about −4.5, the refractive anisotropy (Δn) of the liquid crystal layer 3 is about 0.100 to about 0.130, and the rotation viscosity (γ1) of the liquid crystal layer 3 is about 50 to about 100.

When the liquid crystal layer 3 has the positive dielectric anisotropy, the dielectric anisotropy (Δε) of the liquid crystal layer 3 is about 4 to about 14, the refractive anisotropy (Δn) of the liquid crystal layer 3 is about 0.100 to about 0.130, and the rotation viscosity (γ1) of the liquid crystal layer 3 is about 50 to about 100.

The liquid crystal layer 3 includes about 1% or less of the chiral dopant by weight. By the chiral dopant, the liquid crystal molecules of the liquid crystal layer 3 are twisted and arranged while having a directivity defined by the chiral dopant. At this time, the liquid crystal molecules of the liquid crystal layer 3 may be twisted with a pitch of about 10 μm to about 100 μm. Also, the liquid crystal molecules of the liquid crystal layer 3 may be twisted in the counterclockwise direction or the clockwise direction according to the right-handed rotator or the left-handed rotator of the chiral dopant.

Next, the operation of the liquid crystal display according to the exemplary embodiment shown in FIG. 7 and FIG. 8 will be described with reference to FIG. 9.

Figure 9:
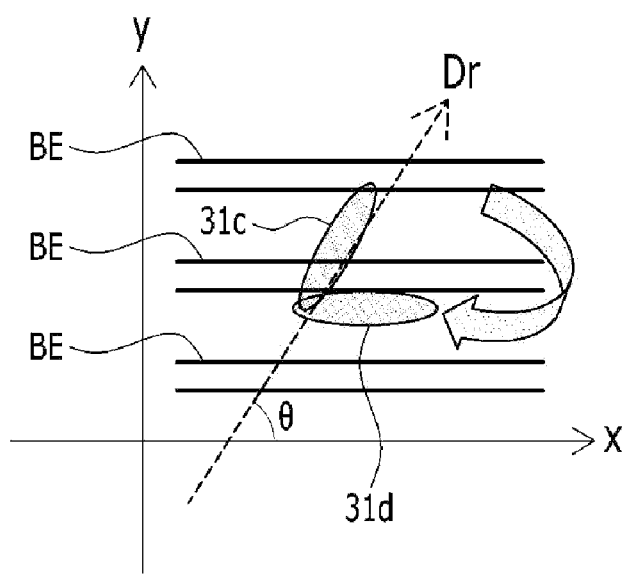
FIG. 9 is a view to explain an operation of a liquid crystal display according to an exemplary embodiment of the present invention.

Referring to FIG. 9, the liquid crystal layer 3 has the negative dielectric anisotropy and the liquid crystal molecules are arranged to have the pretilt angle (θ), where 0°<θ<90°, with respect to the direction x that the gate line 121 extends, therefore being arranged in the direction of a shown third liquid crystal molecule 31c. At this time, the chiral dopant has the left-handed rotator such that the liquid crystal molecules are twisted in the counterclockwise direction from the direction of the third liquid crystal molecule 31c.

If the plurality of branch electrodes (BE) are applied with a voltage such that the electric field is generated in the direction perpendicular to the length direction of the plurality of branch electrodes (BE), the liquid crystal molecules are rotated in the direction perpendicular to the direction of the electric field and are rotated into a position of a fourth liquid crystal molecule 31d. That is, they are rotated in the direction substantially parallel to the length direction of the plurality of branch electrodes (BE).

As described above, the chiral dopant has the left-handed rotator such that the liquid crystal molecules are twisted from the direction of the third liquid crystal molecule 31c in the counterclockwise direction, and this direction is almost the same as the direction of the fourth liquid crystal molecule 31d. Accordingly, like the region positioned with the same interval from two adjacent branch electrodes (BE), the liquid crystal molecules positioned in the region where the intensity of the electric field is relatively weak may be quickly rotated in the direction of the fourth liquid crystal molecule 31d by the directivity of the chiral dopant.

Accordingly, the transmittance of the liquid crystal display is high and the response speed is fast.

In addition, the pretilt angle of the liquid crystal molecules of the liquid crystal layer 3 and the left-handed rotator and the right-handed rotator of the chiral dopant may be changed.

Many characteristics of the liquid crystal display according to the exemplary embodiment shown in FIG. 1, FIG. 2, FIG. 5, and FIG. 6 may be applied to the liquid crystal display according to the present exemplary embodiment.

Figure 10:
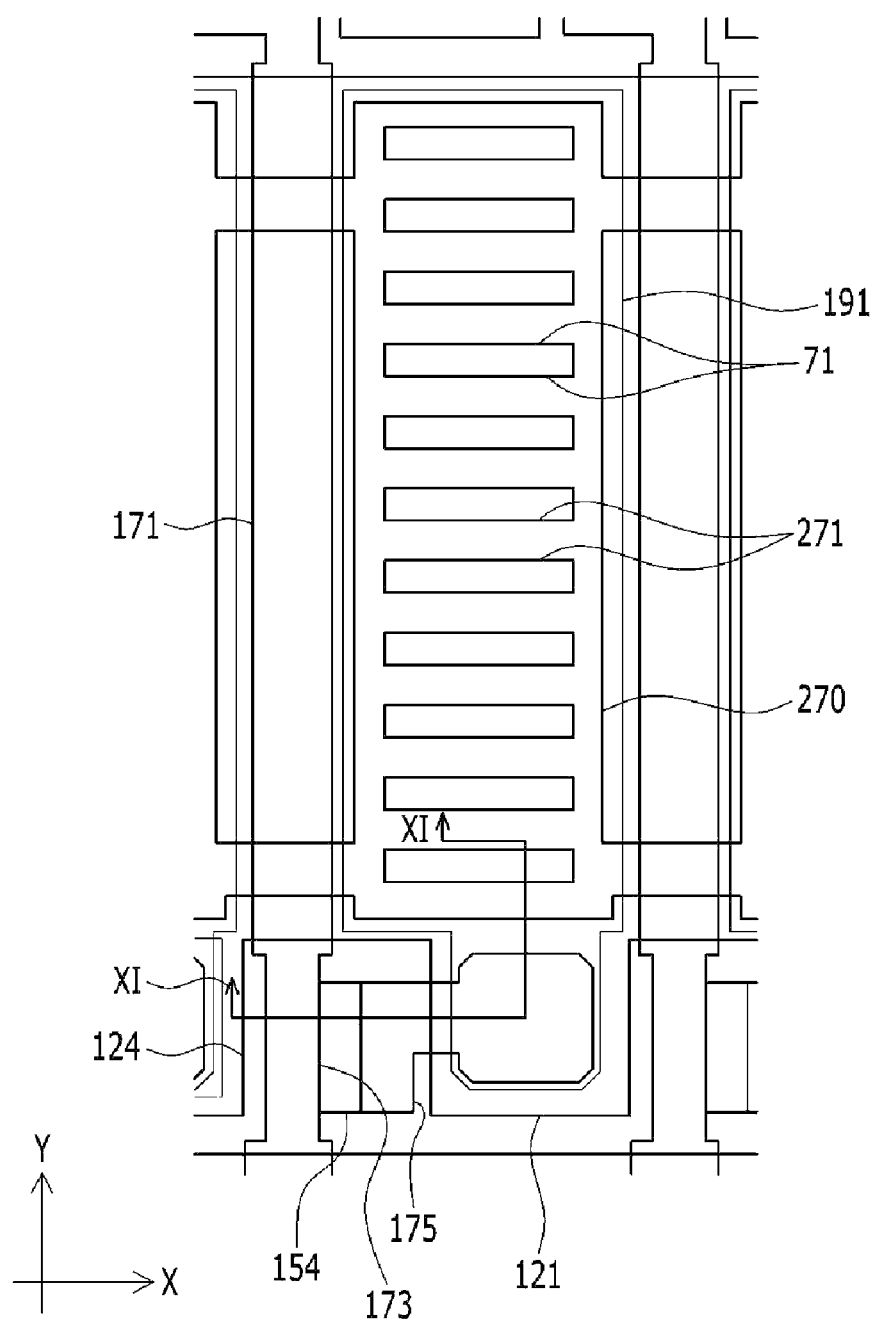
FIG. 10 is a layout view of a liquid crystal display according to another exemplary embodiment of the present invention.

The liquid crystal display according to another exemplary embodiment of the present invention will be described with reference to FIG. 10 and FIG. 11. FIG. 10 is a layout view of a liquid crystal display according to another exemplary embodiment of the present invention, and FIG. 11 is a cross-sectional view of the liquid crystal display of FIG. 9 taken along the line XI-XI.

Figure 11:
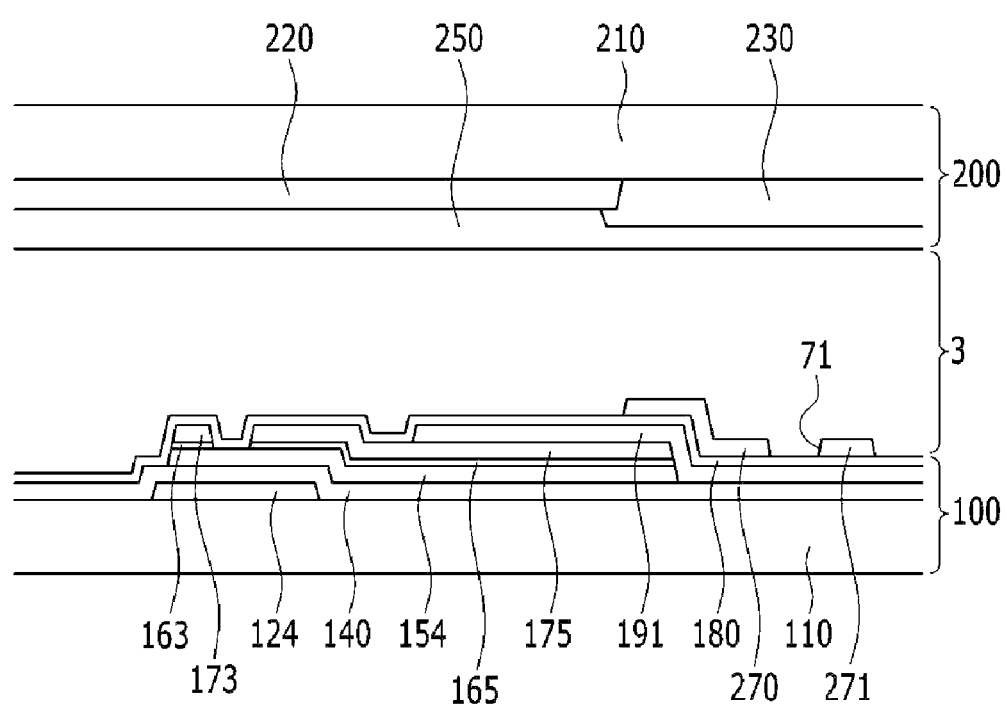
FIG. 11 is a cross-sectional view of the liquid crystal display of FIG. 10 taken along the line XI-XI.

Referring to FIG. 10 and FIG. 11, the liquid crystal display according to the present exemplary embodiment is similar to the liquid crystal display according to the exemplary embodiment shown in FIG. 5 and FIG. 6. A detailed description of the same constituent elements will be omitted.

Referring to FIG. 10 and FIG. 11, the liquid crystal display according to the exemplary embodiment of the present invention includes the lower display panel 100 and the upper display panel 200 that face each other, and the liquid crystal layer 3 injected therebetween.

Regarding lower display panel 100, the gate conductors 121 and 124 including the gate line 121 and the gate electrode 124 are disposed on the insulating substrate 110, and the gate insulating layer 140 is disposed on the gate conductors 121 and 124.

The semiconductor 154 is disposed on the gate insulating layer 140. The ohmic contacts 163 and 165 are disposed on the semiconductor 154. In the case where the semiconductor 154 is the oxide semiconductor, the ohmic contacts 163 and 165 may be omitted.

The data conductor including the data line 171 including the source electrode 173 and the drain electrode 175 is disposed on the ohmic contacts 163 and 165 and the gate insulating layer 140.

The pixel electrode 191 is disposed directly on the drain electrode 175. The pixel electrode 191 is disposed in one pixel region to have a planar shape, that is, a plate shape.

The passivation layer 180 is disposed on the data conductors 171, 173, and 175, the gate insulating layer 140, the exposed portion of the semiconductor 154, and the pixel electrode 191. However, in a liquid crystal display according to another exemplary embodiment of the present invention, the passivation layer 180 may be disposed between the pixel electrode 191 and the data line 171, and the pixel electrode 191 may be connected through the contact hole (not shown) disposed in the passivation layer 180 to the drain electrode 175.

The common electrodes 270 are disposed on the passivation layer 180. The common electrodes 270 are connected to each other and receive the common voltage from the common voltage application portion disposed outside of the display region.

The common electrode 270 has the plurality of second cutouts 71 and includes the plurality of second branch electrodes 271 substantially defined by the second cutouts 71.

In contrast to the liquid crystal display according to the exemplary embodiment shown in FIG. 5 and FIG. 6, the plurality of second branch electrodes 271 of the common electrode 270 of the liquid crystal display according to the present exemplary embodiment are substantially parallel to the direction (the x direction) that the gate line 121 extends.

The first alignment layer (not shown) is disposed on the common electrode 270 and the passivation layer 180. The first alignment layer may be the horizontal alignment layer, and may be rubbed in a direction. However, in the liquid crystal display according to another exemplary embodiment of the present invention, the alignment layer may include a photoreactive material that is photo-aligned.

Regarding upper display panel 200, the light blocking member 220 is disposed on the insulating substrate 210. The plurality of color filters 230 are disposed on the substrate 210. In the case where the color filters 230 are disposed in the lower display panel 100, the light blocking member 220 may also be disposed in the lower display panel 100.

The overcoat 250 is disposed on the color filter 230 and the light blocking member 220. The overcoat 250 may be omitted. The second alignment layer (not shown) is disposed on the overcoat 250.

The liquid crystal layer 3 includes the liquid crystal material having the positive or negative dielectric anisotropy and the chiral dopant. The liquid crystal molecules of the liquid crystal layer 3 are arranged so that a long axis direction thereof is approximately parallel to the display panels 100 and 200, and are arranged to have a pretilt direction by the alignment direction of the first alignment layer and the second alignment layer.

When the liquid crystal layer 3 has the negative dielectric anisotropy, the dielectric anisotropy ($\Delta \in$) of the liquid crystal layer 3 is about −2.5 to about −4.5, the refractive anisotropy (Δn) of the liquid crystal layer 3 is about 0.100 to about 0.130, and the rotation viscosity (γ1) of the liquid crystal layer 3 is about 50 to about 100.

When the liquid crystal layer 3 has the positive dielectric anisotropy, the dielectric anisotropy (Δ∈) of the liquid crystal layer 3 is about 4 to about 14, the refractive anisotropy (Δn) of the liquid crystal layer 3 is about 0.100 to about 0.130, and the rotation viscosity (γ1) of the liquid crystal layer 3 is about 50 to about 100.

The liquid crystal layer 3 includes about 1% or less of the chiral dopant by weight. By the chiral dopant, the liquid crystal molecules of the liquid crystal layer 3 are twisted and arranged while having directivity determined by the chiral dopant. At this time, the liquid crystal molecules of the liquid crystal layer 3 may be twisted with a pitch of about 10 μm to about 100 μm. Also, the liquid crystal molecules of the liquid crystal layer 3 may be twisted in a counterclockwise direction or a clockwise direction according to a right-handed rotator or a left-handed rotator of the chiral dopant.

Many characteristics of the liquid crystal display according to the exemplary embodiment shown in FIG. 1, FIG. 2, FIG. 5, FIG. 6, FIG. 7, and FIG. 8 may be applied to the liquid crystal display according to the present exemplary embodiment.

The liquid crystal display according to another the exemplary embodiment of the present invention has resolution of about 600 PPI or more, and among the adjacent pixel rows, in one pixel row, like the pixel shape according to the exemplary embodiment shown in FIG. 1, FIG. 2, FIG. 5, and FIG. 6, the branch electrodes may extend parallel to the direction perpendicular to the extending direction of the gate line, while in the other pixel row, like the pixel shape according to the exemplary embodiment shown in FIG. 7, FIG. 8, FIG. 10, and FIG. 11, the branch electrodes may extend parallel to the extending direction of the gate line. As described above, by differentiating the direction that the branch electrodes extend according to the pixel row, the wide viewing angle may be realized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a first insulation substrate;
   a gate line and a data line disposed on the first insulation substrate;
   a first electrode and a second electrode disposed on the gate line;
   an insulating layer interposed between overlapping portions of the data line and the gate line;
   a second insulation substrate facing the first insulation substrate; and
   a liquid crystal layer disposed between the first insulation substrate and the second insulation substrate, the liquid crystal layer comprising liquid crystal molecules and a chiral dopant,
   wherein a content of the chiral dopant is about 1% by weight, based on the total weight of the liquid crystal layer, and
   wherein a rotated direction of a long axis of the liquid crystal molecules depending on a direction of an electric field generated by the first electrode and the second electrode and a twisted direction of the liquid crystal molecules depending on the directivity of the chiral dopant are almost the same,
   wherein the rotated direction of the long axis of the liquid crystal molecule having positive dielectric anisotropy is parallel to the direction of the electric field and the rotated direction of the long axis of the liquid crystal molecule having negative dielectric anisotropy is perpendicular to the direction of the electric field, and
   wherein the twisted direction of the liquid crystal molecules is a counterclockwise direction when the chiral dopant has a right-handed rotator and the twisted direction of the liquid crystal molecules is a clockwise direction when the chiral dopant has a left-handed rotator.

2. The liquid crystal display of claim 1, wherein the liquid crystal molecules are twisted by the chiral dopant and have a pitch of 10 μm to 100 μm.

3. The liquid crystal display of claim 2, wherein:
   the first electrode has a planar shape and a flat surface;
   the second electrode comprises branch electrodes that overlap the first electrode and are substantially parallel to the gate line or the data line.

4. The liquid crystal display of claim 2, further comprising:
   a first alignment layer disposed on the first insulation substrate; and
   a second alignment layer disposed on the second insulation substrate, wherein,
   the liquid crystal molecules have positive dielectric anisotropy, the first alignment layer and the second alignment layer configured to pretilt the liquid crystal molecules, such that the long axis of the liquid crystal molecules is disposed at an angle between 0° and 90°, with respect to the gate line, and
   the chiral dopant has the left-handed rotator.

5. The liquid crystal display of claim 2, further comprising:
   a first alignment layer disposed on the first insulation substrate; and
   a second alignment layer disposed on the second insulation substrate, wherein,
   the liquid crystal molecules have positive dielectric anisotropy,
   the first alignment layer and the second alignment layer are configured to pretilt the liquid crystal molecules, such that the long axis of the liquid crystal molecules is disposed at an angle between 90° and 180°, with respect to the gate line, and
   the chiral dopant has the right-handed rotator.

6. The liquid crystal display of claim 2, further comprising:
   a first alignment layer disposed on the first insulation substrate; and
   a second alignment layer disposed on the second insulation substrate, wherein,
   the liquid crystal molecules have negative dielectric anisotropy,
   the first alignment layer and the second alignment layer are configured to pretilt the liquid crystal molecules, such that the long axis of the liquid crystal molecules is disposed at an angle between 0° and 90°, with respect to the gate line, and
   the chiral dopant has the right-handed rotator.

7. The liquid crystal display of claim 2, further comprising:

a first alignment layer disposed on the first insulation substrate; and a second alignment layer disposed on the second insulation substrate, wherein, the liquid crystal molecules have negative dielectric anisotropy, the first alignment layer and the second alignment layer are configured to pretilt the liquid crystal molecules, such that the long axis of the liquid crystal molecules is disposed at an angle between 90° and 180°, with respect to the gate line, and the chiral dopant has the left-handed rotator.

8. The liquid crystal display of claim 1, further comprising:

a first alignment layer disposed on the first insulation substrate; and a second alignment layer disposed on the second insulation substrate, wherein the liquid crystal molecules have positive dielectric anisotropy, the first alignment layer and the second alignment layer are configured to pretilt the liquid crystal molecules, such that the long axis of the liquid crystal molecules of the liquid crystal layer is disposed at an angle between 0° and 90°, with respect to the gate line, and the chiral dopant has a left-handed rotator.

9. The liquid crystal display of claim 1, further comprising:

a first alignment layer disposed on the first insulation substrate;

a second alignment layer disposed on the second insulation substrate; and a liquid crystal layer comprising liquid crystal molecules having positive dielectric anisotropy disposed between the first alignment layer and the second alignment layer, wherein the first alignment layer and the second alignment layer are configured to pretilt the liquid crystal molecules, such that the long axis of the liquid crystal molecules is disposed at an angle between 90° and 180°, with respect to the gate line, and the chiral dopant has a right-handed rotator.

10. The liquid crystal display of claim 1, further comprising:

a first alignment layer disposed on the first insulation substrate;

a second alignment layer disposed on the second insulation substrate; and a liquid crystal layer comprising liquid crystal molecules having negative dielectric anisotropy disposed between the first alignment layer and the second alignment layer, wherein the first alignment layer and the second alignment layer are configured to pretilt the liquid crystal molecules, such that the long axis of the liquid crystal molecules is disposed at an angle between 0° and 90°, with respect to the gate line, and the chiral dopant has a right-handed rotator.

11. The liquid crystal display of claim 1, further comprising:

a first alignment layer disposed on the first insulation substrate;

a second alignment layer disposed on the second insulation substrate; and a liquid crystal layer comprising liquid crystal molecules having negative dielectric anisotropy disposed between the first alignment layer and the second alignment layer, wherein the first alignment layer and the second alignment layer are configured to pretilt the liquid crystal molecules, such that the long axis of the liquid crystal molecules is disposed at an angle between 90° and 180°, with respect to the gate line, and the chiral dopant has a left-handed rotator.

* * * * *